(12) United States Patent
Delenda

(10) Patent No.: US 7,788,133 B2
(45) Date of Patent: *Aug. 31, 2010

(54) METHOD AND SYSTEM FOR REAL-TIME ALLOCATION OF A RESOURCE AMONG SEVERAL ENTITIES

(76) Inventor: Arnaud Delenda, 103, Rue Olivier de Serres, Paris (FR) 75015

( * ) Notice: Subject to any disclaimer, the term of this patent is extended or adjusted under 35 U.S.C. 154(b) by 1498 days.

This patent is subject to a terminal disclaimer.

(21) Appl. No.: 10/412,901

(22) Filed: Apr. 14, 2003

(65) Prior Publication Data
US 2004/0024687 A1 Feb. 5, 2004

(30) Foreign Application Priority Data
Apr. 15, 2002 (FR) .................................. 02 04654

(51) Int. Cl.
*G06Q 30/00* (2006.01)
(52) U.S. Cl. .................... 705/26; 705/1; 705/27; 705/35; 705/36 R; 705/37; 705/8; 705/80; 709/225; 370/322
(58) Field of Classification Search .............. 705/8, 705/26, 27, 37, 80, 36 R; 700/228; 370/322
See application file for complete search history.

(56) References Cited

U.S. PATENT DOCUMENTS

| 5,442,634 A | 8/1995 | Cizek |
| 6,005,852 A | 12/1999 | Kokko et al. |
| 6,078,901 A * | 6/2000 | Ching .................. 705/36 R |

(Continued)

FOREIGN PATENT DOCUMENTS

WO    WO 00/57323    9/2000

(Continued)

OTHER PUBLICATIONS

Semret et al, "Pricing, Provisioning and Peering: Dynamic Markets for Differentiated Internet Services and Implications for Network Interconnections", INFOCOM 2000, 414-420, 2000 [the article provided as IDS in US Publication 20040111308 A1 to Yakov].*

(Continued)

*Primary Examiner*—Yogesh C Garg
(74) *Attorney, Agent, or Firm*—McDonnell Boehnen Hulbert & Berghoff LLP (57) ABSTRACT

A technique for the allocation and pricing of a resource among n buying agents during an auction bid. A bid sent by each buying agent in the form of a resource demand function $s_i(p)$ is received, and a datum corresponding to the equilibrium price $p^*$ is calculated from the sum S of the n demand functions $s_i(p)$, by means of the relation: $S(p^*)=Q$. All of the bids received during a predetermined period corresponding to a round of bidding are processed in order to determine the quantity of a resource to be allocated to each buying agent. This is followed by the calculation of the data corresponding to the quantity $a_i$ to be allocated for this equilibrium price $p^*$ to each buying agent i based on its demand function $s_i$ such that $a_i = s_i(p^*)$. The management system utilizes the calculated data to allocate the corresponding quantities of the resource, and this data is stored in order to calculate the price to be billed to each buying agent.

6 Claims, 5 Drawing Sheets

U.S. PATENT DOCUMENTS

| | | | | |
|---|---|---|---|---|
| 6,119,052 | A * | 9/2000 | Guenther et al. | 700/228 |
| 6,556,548 | B1 * | 4/2003 | Kirkby et al. | 370/322 |
| 6,968,323 | B1 * | 11/2005 | Bansal et al. | 705/80 |
| 2004/0010592 | A1 * | 1/2004 | Carver et al. | 709/226 |
| 2004/0111308 | A1 * | 6/2004 | Yakov | 705/8 |
| 2004/0192324 | A1 * | 9/2004 | Rudkin | 455/452.2 |
| 2005/0289043 | A1 * | 12/2005 | Maudlin | 705/37 |
| 2007/0297328 | A1 * | 12/2007 | Semret et al. | 370/230 |

FOREIGN PATENT DOCUMENTS

WO  WO 01 93033 A  12/2001

OTHER PUBLICATIONS

Klemperer P., "Auction Theory: A Guide to the Literature", Journal of Economic Surveys, 13 (3), pp. 227-286, 1999.

Semret N., "Market Mechanisms for Network Resource Sharing", Philosophy Doctorate at Columbia, 1999.

* cited by examiner

3 EXAMPLES OF UTILITY FUNCTIONS FOR SAME $q_{max}$

FIG.2A

THE 3 CORRESPONDING MARGINAL UTILITIES

METHOD AND SYSTEM FOR REAL-TIME ALLOCATION OF A RESOURCE AMONG SEVERAL ENTITIES

FIELD OF THE INVENTION

The invention concerns a method and a system for real-time allocation and pricing of a resource among several competing buyers through an auction, when this resource is limited in quantity, and when one or more buyers require a certain quantity of this resource at a given moment and the overall demand exceeds the supply.

In essence, whether at the level of a management system of a telecommunication network or of a piece of equipment shared by several buyers, the problem lies in the sharing of the resources supplied by this system or this piece of equipment among these various buyers and in the implementation of the mechanism for controlling this allocation.

One of the problems that such a mechanism must solve is to perform an arbitration among the various buyers when the overall demand from the buyers exceeds the total resource volume available (i.e., the supply). When the demand from the buyers is lower than the supply, the buyers can be allocated everything they demand and there is no problem.

The invention applies to any system for allocating a quantitatively divisible resource.

BACKGROUND OF THE INVENTION

The term buyer is used to designate either a buying client or a buying agent, or even the user of the auction bid system depending on the field of application of the auction. The buying client acts through its buying agent.

The buying agent can be any logical agent, such as a software agent or automaton, that is capable of implementing an automatic procedure involved in the implementation of an auction through a telecommunication network.

The term seller is applied to the resource seller, such as a telecommunication company, for example. The seller acts through its buying agent which can also be any logical agent, such as a software agent or automaton, that is capable of implementing an automatic procedure involved in the implementation of an auction through a telecommunication network.

The term auctioneer is applied to a logical mediating (or auction organizing) agent that functions as the system for managing allocation of the resource to the buyers.

There are many existing techniques for handling the allocation of resources. For example, there are mechanisms that operate based on the order of arrival: FIFO, LIFO, etc. For a FIFO (First In First Out) mechanism, it is the buyers who have formulated their bids earliest who are served. For a LIFO (Last In First Out) mechanism, conversely, it is the last one to have formulated a demand who is served.

There are also other mechanisms that do not exclude any buyer. In such mechanisms, the arbitration takes place at the level of the quantity of the resource allocated to each buyer. A rule defining the quantities allocated in proportion to the quantities demanded, for example, is used as the arbitration rule.

These mechanisms are not always very efficient from an economic point of view. In fact, an appropriate match between the supply (the quantity offered and the price) and the demand (quantities desired or obtained) can be difficult to obtain.

With such mechanisms, there are off-peak periods when the demand is lower than the available quantity of the resource and peak periods when the demand greatly exceeds the available resources.

Moreover, these mechanisms are relatively static. They are not capable of adapting and remaining relevant when the supply and the demand for resources from buyers undergo steep and rapid fluctuations.

One possible solution for meeting this criterion for the economic efficiency and adaptability of the resource allocation process is to use an allocation technique based on market mechanisms, and more specifically, on auctions.

In the applications intended by the present invention, the asset being the quantity of a resource that one wishes to allocate, this asset is considered to be quantitatively divisible.

We are more particularly interested here in multi-unit auctions (the asset is divisible). The resource we are considering is composed of several units.

We are more precisely interested here in multi-unit auctions. We cite as an example the theory developed by Klemperer (Klemperer P., *Auction Theory: A Guide to the Literature*, Journal of Economic Surveys, 13 (3), 227-86, 1999).

Unfortunately, most of the research done based on multi-unit auctions relates only to the theoretical properties of these auctions.

Other research deals with auctions that are generally run at the instigation of public or regulatory agencies, during which certain rare resources or rights of use have been put up for sale. An important example concerns the rights of use for radio-telecommunication frequencies: GSM or UMTS frequencies. In both cases, no concrete auction mechanism has been proposed for controlling the resource allocation process.

To date, there is only one known concrete process that addresses the problem in which we are interested.

It is an auction mechanism that will hereinafter be referred to as "PSP," the acronym for "Progressive Second Price," proposed and digitally tested by Nemo Semret (Semret N., *Market Mechanisms for Network Resource Sharing*, Philosophy Doctorate at Columbia, 1999), in the course of research for a dissertation at Columbia University in 1999. "PSP" is an auction mechanism that attempts to generalize the Vickrey principle to the case of a multi-unit resource.

By using the exclusion-compensation principle (which is the principle that underlies the self-revelation properties of Vickrey auctions) in the case of a multi-unit asset, a "player" who obtains a certain quantity of a resource pays the price that those whom he caused to lose by his presence were prepared to pay for a certain quantity of the resource. The total of this quantity corresponds at most to the quantity he has obtained. It is, of course, the "players" who have made the highest bids who obtain the asset.

The PSP auction mechanism for controlling and pricing a resource is disclosed in International patent application published on Sep. 28, 2000 as WO 00/57323.

The mechanism for allocating and pricing a resource defined by PSP auctions works through an iterative negotiation process among the following three types of parties:

1. The logical selling agent of the resource, which is trying to sell this resource at the best price (i.e., the price that will maximize his income and hence the highest price possible),
2. Buying agents who wish to obtain a certain quantity of this resource under the best conditions. A best condition is characterized by a pair (quantity, price) and it depends on each player.

3. The logical mediating agent (or auctioneer), whose objective is to succeed in best satisfying the two preceding parties involved.

The role of the logical mediating agent (auctioneer) can be held by the seller of the resource.

In theory, the PSP auction mechanism does result in an equilibrium, but it has some disadvantages.

First of all, the convergence speed is not very satisfactory. Even assuming a constant number of buyers, it requires many iterations of the negotiation process to reach the equilibrium ensuring maximum satisfaction for all of the buyers.

Operationally, this convergence defect results in:

either a high volume of messages between the buyers and the auctioneer (heavy signaling traffic in the system) and many calculations performed by the buyers and the auctioneer in the case where it is decided to increase the frequency of iterations in order to reach equilibrium more quickly, or a degradation of the process with respect to its optimal equilibrium if the frequency of the renegotiations is limited (every minute or more). The buyers cannot return any counterbids before this minimum delay.

In the case of a dynamic operation, the buyers enter and exit the system continuously. The time between two renegotiations can become on the same order of magnitude as the average time between the arrival or departure of a new buyer. Under these conditions, the iterative PSP negotiation process will never achieve the equilibrium of maximum satisfaction for the buyers. It will always be in a transitory state, possibly far from the state of optimal equilibrium.

Another disadvantage is that the PSP process as described by Nemo Semret permits buyers to form a coalition in order to pay less. It is also possible for the seller to act on the mechanism in order to maximize his income based on bids declared by the other buyers.

These two disadvantages caused by the iterative nature of the mechanism are particularly bothersome with respect to the impartiality that any auction mechanism must imperatively maintain.

SUMMARY OF THE INVENTION

The object of the present invention is to propose a method that does not have the disadvantages of the prior art.

According to the invention, the step for determining the quantity of a resource allocated to each buying agent is completed in a single round of bidding.

The invention more particularly concerns a method for the allocation and pricing of a resource among n buying agents during an auction bid, by a system for managing said resource, through a telecommunication network. A bid is received which was sent by each buying agent in the form of a resource demand function $s_i(p)$, in which p is the variable price (a bid is a message that contains a demand function), these demand functions being predefined positive decreasing and continuous functions. All of the bids are processed which were received during a predetermined period corresponding to a round of bidding, in order to determine the quantity of a resource to be allocated to each buying agent. This processing includes calculating a datum corresponding to the equilibrium price $p^*$ from the sum S of the n demand functions $s_i(p)$, by means of the relation: $S(p^*)=Q$, in which Q is the available quantity datum, and S(p) is the total demand corresponding to the sum of the demands $s_i(p)$ from each buying agent for each price value p, as expressed by $S(p)=s_1(p)+s_2(p)+ \ldots + s_i(p)+ \ldots +s_n(p)$. The data corresponding to the quantity $a_i$ to be allocated for this equilibrium price $p^*$ to each buying agent i is calculated based on its demand function $s_i$ such that $a_i=s_i(p^*)$. The management system utilizes the data obtained from the calculation of $a_i$ to allocate the corresponding quantities of resources, and this data is stored in order to calculate the price to be billed to each buying agent.

According to another feature, the method includes programming the demand function $s_i(p)$ into each buying agent.

According to another feature, the method includes programming a function $U'_i(q)$ into the buying agent i, each buying agent i participating in an auction thus being characterized by its interest in obtaining a quantity q of the global resource Q, through its utility function $U_i(q)$ or through a marginal utility function $U'_i(q)$ provided for the acquisition of an additional unit, $U'_i(q)$ being the derivative of $U_i(q)$. In each auction the demand function $s_i(p)$ is calculated by calculating the inverse of the function $U'_i(q)$, the buying agent sending its bid by sending this function.

According to another feature, the demand function includes supplying the management system with data corresponding to m parameters characterizing this demand function.

According to another feature the utility function is a polynomial function with the form:

$$U(q) = \frac{\min(q, q_{max}) * (q_{max} - 0, 5 * \min(q, q_{max}))}{\alpha}$$

which yields a demand function S (p)

$$S(p) = \max(0; q_{max} - \acute{a}p)$$

where p is the (marginal) price that the buyer is prepared to pay for an additional unit of a resource beyond $q=s(p)$.

According to another feature, the utility function is a polynomial function with the form:

$$U(q) = \frac{\min(q, q_{max}) * (Ln(q_{max}) - Ln(\min(q, q_{max})) + 1)}{\alpha}$$

Ln is the neperian logarithm, which yields a demand function S (p)

$$S(p) = q_{max} * \exp(-\acute{a}*p)$$

where p is the (marginal) price that the buyer is prepared to pay for an additional unit of a resource beyond $q=s(p)$.

According to another feature, the buying agent sends its bid, supplying only two parameters (m=2) characterizing its demand function, these parameters being the coefficient $\alpha$ indicating the buyer's predisposition to pay and $q_{max}$ indicating the maximum quantity he wishes to acquire. This bid may be the same for several successive auctions.

According to another feature, the calculation of the price to be billed to each buying agent includes a calculation of the total price $C_i(s)$ of the quantity $a_i$ allocated to a buying agent i for the obtainment of the quantity ai when the latter has bid the function $s_i$, based on the exclusion compensation principle, this calculation being based on the following relation:

$$C_i(s) = \sum_{j \neq i} \int_{a_j^s}^{a_j^0} S_j^{-1}(p) dp$$

in which, for the buying agent j, $a_j^s$ represents its allocation in the presence of the buying agent i and $a_j^0$ represents its allocation in its absence, the competing buyers j in this case being allocated the quantity $aj^o$, whereas they have only $aj^s$ in the current situation due to its presence, $sj^{-1}$ being the inverses of the demand functions of the buying agents j competing with the buying agent i.

According to another feature, the management system is a telecommunication resources management system and the resource is bandwidth.

The invention also concerns a system for managing a resource comprising means for allocating and pricing said resource among n buying agents during an auction bid, through a telecommunication network. This means includes means for receiving a bid sent by each buying agent in the form of a resource demand function $s_i(p)$, in which p is the variable price, these demand functions being predefined positive decreasing and continuous functions, and means for processing all of the bids received during a predetermined period corresponding to a round of bidding, in order to determine the quantity of a resource to be allocated to each buying agent. The processing means includes means for calculating a datum corresponding to the equilibrium price p* from the sum S of the n demand functions $s_i(p)$, by means of the relation $S(p^*)=Q$, in which Q is the available quantity datum, and $S(p)$ is the total demand corresponding to the sum of the demands $s_i(p)$ from each buying agent for each price value p, as expressed by $S(p)=s_1(p)+s_2(p)+\ldots+s_i(p)+\ldots+s_n(p)$. The processing means also includes means for calculating the data corresponding to the quantity $a_i$ to be allocated for this equilibrium price p* to each buying agent i based on its demand function $s_i$ such that $a_i=s_i(p^*)$), and means for allocating the corresponding quantities of resources and for storing this data in order to calculate the price to be billed to each buying agent.

According to another feature, the means for allocating and pricing the resource are comprised of a server type computer programmed for this purpose, said server being linked to the equipment of the telecommunication network in charge of controlling the resource that is to be shared.

According to another feature, the buying agents include means for storing at least one demand function and means for bidding with this function in each auction.

According to another feature, in the case where the demand function is characterized by only two parameters, the buying agents include means for choosing a pair of values for the parameters in each auction and for providing it to the server.

According to another feature, the buying agents are comprised of automata programmed to make the bids in accordance with the buyer and to dialog with the server.

According to another feature, the automata are constituted by software agents that can be placed in the server.

In the case where the invention is applied to the telecommunications field, the resource to be allocated can be bandwidth, or the ports of a piece of equipment for accessing a network.

BRIEF DESCRIPTION OF THE DRAWINGS

Other features and advantages of the invention will clearly emerge through the reading of the description that is given below as a non-limiting example and in reference to the drawings, in which.

DETAILED DESCRIPTION OF THE DRAWINGS

To begin with, it should be noted that each time price is mentioned above, and each time it is mentioned below, it does not indicate a sum of money in "the absolute," but a price per unit of time used. In the case of a telecommunication network resource, the sum that the buyer must pay will therefore be the product of this unit price and the time during which he remains connected to the network.

We must, of course, also consider the potential variations in the unit price during the connection period. Moreover, the price to be paid by the buyer is not necessarily monetary. It could involve "credits" or "tokens" that the buyer may have acquired when he subscribed to a service, or that he may have bought through a system like a prepaid card.

The proposed auction mechanism for allocating and pricing a multi-unit resource among several buyers is based on the fact that each buyer i has an interest in receiving a part (quantity) $a_i$ of the total resource Q. The mechanism makes it possible to allocate the "right" quantities $a_i$ of the resource to each of the buyers for a charge to be paid $C_i$.

In the proposed method, each buyer is induced to provide his real evaluation (or even his utility) in order to obtain the quantity of the resource (in the buyer's case), or the price at which he is prepared to sell the resource (in the seller's case).

In essence, the selling agent is considered a buying agent that buys the entire quantity of the resource Q. He can avoid selling the resource for less than a minimum limit price. The risk of this operation is that a certain quantity of resource may not be sold (having been bought by him).

The proposed mechanism adapts to variations in the number of buyers and to their predisposition to pay for the resource. There may be off-peak periods with few buyers and peak periods with many more buyers.

The proposed mechanism therefore allows the demand from the buyers to be regulated in accordance with the constant supply of a resource Q through a variable bid price.

In order to obtain a significant quantity of a resource during a peak period, the buyer must agree to pay a higher price. Conversely, during off-peak periods, he can obtain a large quantity of a resource for a more moderate price.

The mechanism according to the invention is not iterative. It results in an equilibrium of better satisfaction for the buyers in a single round of bidding (a single iteration), during which the buyers bid the real evaluation they have made as to the value of the resource.

Furthermore, the proposed mechanism uses the principle of Vickrey auctions in the multi-unit case by employing the pricing principle based on exclusion-compensation.

This auction mechanism works in the following way:

a seller has any quantity Q of a resource or a divisible asset to sell.

Typically, in a telecommunication or network application, this could be bandwidth, or even logic gates for accessing a piece of equipment.

n buyers are demanders, which means that they are in competition for the sharing of this resource. Each of them positions himself based on a utility function $U_i$ for the quantity q he wishes to have.

In essence, this is the buyer's evaluation of his interest in a certain quantity of a resource.

The choice of a utility function could be left entirely up to the buying agents, but for purposes of practical implementation, we prefer to propose that the buyer position himself based on a choice of utility functions predefined in the automaton programmed for this purpose for the negotiation.

The buyer's utility function $U_i(q)$ makes it possible to deduce his demand function $s_i(p)$. In concrete terms, a buyer's demand function is the inverse of the marginal utility function $U'_i(q)$. Consequently, there is a slight misuse of language here, since the demand function thus constructed yields the value of a buyer's demand q as a function of the marginal price that this buyer is prepared to pay for the resource between q and q+δq, where δq is a small quantity, whereas more traditionally, a demand function yields a quantity q of a resource that the buyer is prepared to acquire as a function of an average price of the resource.

The negotiator of the sale, or auctioneer, (the server 200 in FIG. 5) collects the demand functions $s_i(p)$ from the various buyers and knows the total quantity Q for sale.

In order to bid, a buyer gives his demand function $s_i(p)$, which could in practice be the inverse of his marginal utility function for the resource.

The buyers can of course declare an insincere demand function (not tell the truth, i.e., not reflect their real evaluation of the resource). However, the method according to the present invention implements a mechanism for calculating resource allocation and billing that induces each buyer to bid the truth since it maximizes the gain function for each buyer.

The buyer's gain function g represents the difference between the utility that procures him the acquisition of a quantity of a resource and the price that he must pay for this quantity, i.e. $g(s)=Ui(ai(s))-ci(s)$. The applicant has demonstrated that declaring his true demand function is a dominant strategy for each buyer.

According to the invention, each buyer i consequently has an evaluation for the acquisition of a quantity $q_i$ of a resource, which translates into a utility function $U_i(q)=0$; this evaluation is in fact private data. Calculating the derivative of this function, $U'_i(q)$, yields the marginal utility function provided by the buyer i upon acquisition of an additional unit of a resource.

In mathematical terms, the function $U_i(q)$ is characterized by meeting the following conditions:

$U_i(0)=0$, $U_i$ is derivable and concave, $U'_i \leq 0$ is decreasing and continuous. It is a function derived from the function U(i). It characterizes the marginal utility of the buyer i for the resource i, i.e. the price he is prepared to pay to obtain a unit of the resource beyond what he has already obtained.

Figure 1A:
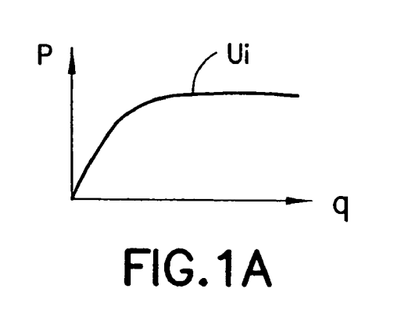
FIGS. 1A and 1B represent a utility function $U'_i$ and its derivative $U'_i$ (marginal utility)
Figure 1B:
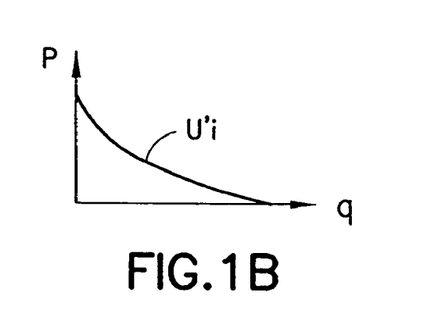

FIGS. 1A and 1B illustrate a general form of the functions $U_i(q)$ and $U'_i(q)$.

As may be seen, the utility function of a buyer 100i (FIG. 5) increases continuously with the quantity he can obtain, but this increase is sublinear (concave). This means that as the quantity obtained increases, the interest in any additional unit decreases. In the extreme, there is a limited quantity of a resource (a threshold) for each buyer, beyond which this buyer has no further interest in (i.e., is no longer prepared to pay for) obtaining an additional unit.

For each negotiation step (with each new auction), the server 200 collects all of the bids in the form of demand functions $s_i$ (one function per buyer i).

From this information, the auctioneer 200 determines for each price value p the total demand S, which is the sum of the individual demands. The auctioneer 200 calculates a market equilibrium price p* which equalizes the supply and the demand such that:

$S(p^*)=Q$. Q represents the entire quantity for sale, which is therefore the total supply.

Having thus defined the market price p*, the auctioneer 200 can then calculate the resource allocations $a_1, a_2, \ldots, a_i, \ldots, a_n$ for each player by performing the following calculation:

$a_i=s_i(p^*)$ for each buyer (i=1 through n).

Using this calculation, the auctioneer determines, as the allocation to each buyer, the value of his demand function for the price p*.

The auctioneer 200 assigns each buyer an allocated quantity $a_i$ thus calculated, and also informs them of the fictitious market equilibrium price that serves as the basis of the mechanism.

Some buyers may not be served; in fact, for the price p* some buyers j may have zero demand, i.e., $s_j(p^*)=0$.

This allocation negotiation step is repeated at predefined regular intervals during the operation of the resource allocation-pricing system.

The frequency of repetition of the negotiation is chosen so as not to be too high, in order not to use too many computing resources and/or congest the network with signaling messages between the buyer's software 100i and the server 200. This frequency should nevertheless be enough to accommodate the following developments: arrivals or departures of buyers, changes in current buyers' demand functions, and possibly, variations in the quantity of the resource available.

A second step of the method then includes calculating the corresponding pricing, i.e. determining the charges to be paid for each buyer i. This pricing is obtained from the result of the following integral calculation:

$$C_i(s) = \sum_{j \neq i} \int_{a_j^s}^{a_j^0} S_j^{-1}(p)\,dp$$

This relation yields the total price $C_i(s)$ that the buyer i must pay to obtain the quantity $a_i(s)$ determined in the preceding step, when the bid is s. For the buyer j, $a_j^s$ represents his allocation in case of the presence of the buyer i, and $a_j^0$ represents his allocation in the case where the latter is absent. (If the buyer i were not present, then the competing buyers j would be allocated the quantity $a_j^0$, whereas they have only $a_j^s$ in the current situation due to his presence.)

The calculation of the charge involves the inverse function $s_j^{-1}$ of the demand function $s_j$ of the competitors j, since what is sought is a price as a function of an already defined quantity and not a quantity as a function of a price.

Two examples of utility functions and the corresponding demand functions are given below.

It is understood that any utility (and demand) function could be chosen as long as it fulfills the conditions indicated above. These functions can be characterized by m parameters, corresponding for example to the choice of a certain number of characteristic points resulting from a discretization (digitization) of the function.

In a first example, the utility function can be the following polynomial function:

$$U(q) = \frac{\min(q, q_{max}) * (q_{max} - 0, 5 * \min(q, q_{max}))}{\alpha}$$

which yields a demand function S (p)

$$S(p) = \max(0; q_{max} - \alpha * p)$$

where p is the (marginal) price that the buyer is prepared to pay for an additional unit of a resource beyond q=s(p).

In this first example, each buyer i has a polynomial evaluation function $U_i$ (of degree 2) up to the point corresponding to the maximum quantity $q_{max}$ of the buyer i, beyond which this function is constant.

In another example, the utility function can be the following exponential polynomial function:

$$U(q) = \frac{\min(q, q_{max}) * (Ln(q_{max}) - Ln(\min(q, q_{max})) + 1)}{\alpha}$$

in which Ln is the neperian logarithm, which yields a demand function S (p)

$$S(p) = q_{max} * \exp(-\acute{a} * p)$$

where p is the (marginal) price that the buyer is prepared to pay for an additional unit of a resource beyond q=s(p).

In these two cases, the utility function and the marginal utility function $U'_i$ (the function derived from $U_i$), and consequently the demand functions (the inverse function of the marginal utility), can be characterized by only two parameters $q_{max}$ and $\alpha$, in which:

$q_{max}$ is the maximum quantity of a resource beyond which the buying agent is no longer prepared to pay to obtain the additional resource (zero marginal utility) and $\alpha$ a characterizes the buyer's level of interest in the resource. The higher the $\alpha$, the more this interest decreases rapidly with the price of the resource. It is a coefficient indicating the buyer's predisposition to pay.

If planning to use several types of predefined functions (function 1, 2, 3, etc.), it is in fact necessary to provide 3 parameters, the parameters as defined above and a third parameter designating the type of function chosen (function 1 or 2 or 3 from the list of predefined functions).

Figure 2A:
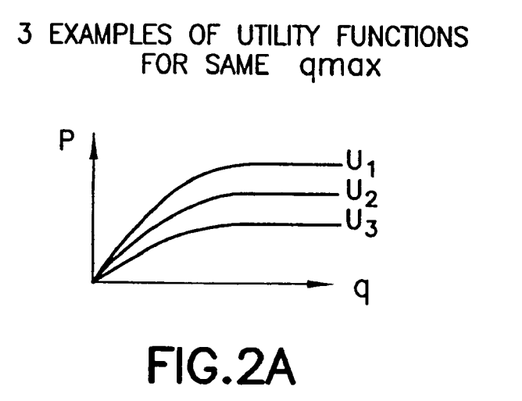
FIGS. 2A and 2B represent three examples of a utility function for the same maximum quantity ($q_{max}$), and the corresponding marginal utilities.
Figure 2B:
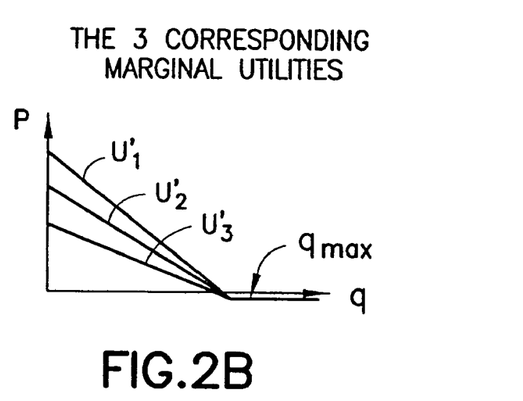
Figure 2C:
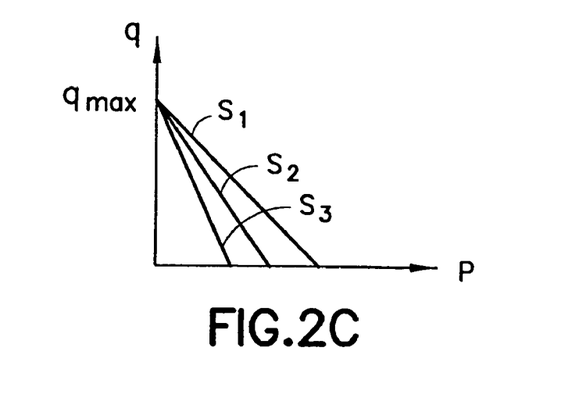
FIG. 2C represents the demand functions corresponding to the marginal utility functions of FIG. 2B.
Figure 2D:
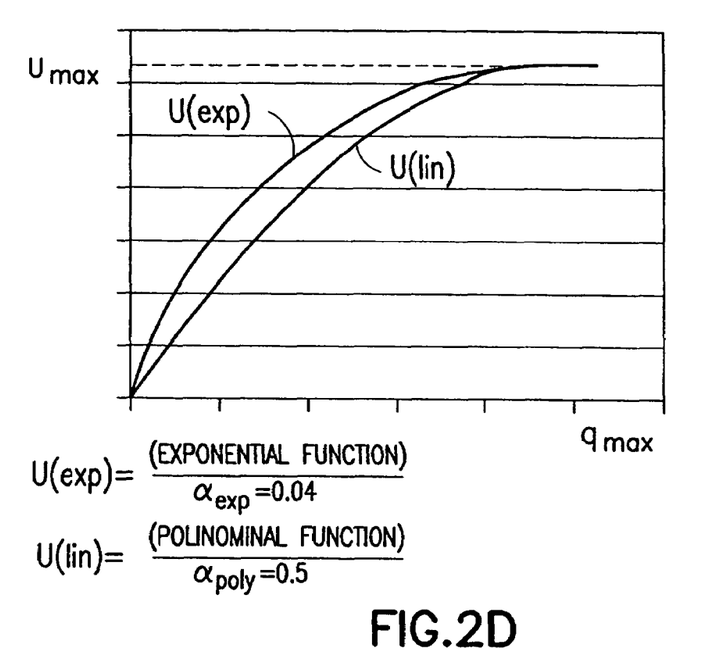
FIG. 2D represents two particular examples of utility functions.
Figure 2E:
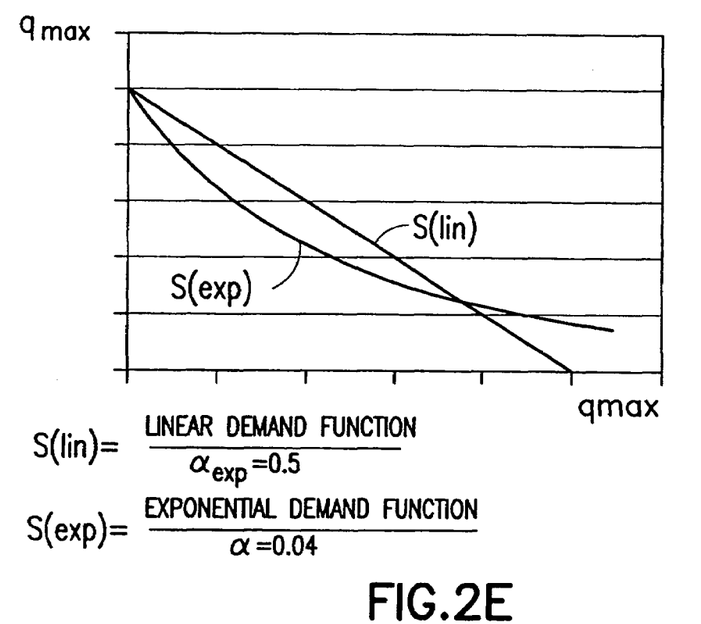
FIG. 2E represents the demand functions corresponding to the utility functions of FIG. 2D.

FIG. 2D illustrates the utility functions corresponding to the two preceding examples. FIG. 2E illustrates the demand functions corresponding to the two utility functions of FIG. 2D.

In these examples, the buyers no longer need to declare to the auctioneer 200 fully defined demand functions for all the possible quantities, but simply the two parameters, $q_{max}$ and $\alpha$ (each buyer bids his demand function).

The bid therefore consists of providing two parameters, i.e., in this case, the pair ($q_{max}$, $\alpha$).

In the case of a mechanism for auctioning bandwidth, the value of $q_{max}$ corresponds to the maximum capacity required by the buyer. The coefficient $\alpha$ itself is chosen from a set of pre-stored values and corresponds to the buyer's desire to obtain this maximum capacity (preparedness to pay more in order to obtain more).

FIGS. 2A and 2B show the behavior exhibited by the utility function and its derivative for three buyers having the same maximum quantity value.

The coefficient $\alpha$ corresponds to the slope of the lines (demand function) of FIG. 2C.

However, rather than leave it up to the buyer to choose any utility function that has the increasing and continuous properties indicated above, it is advantageously proposed that the buyer position himself based on a limited choice of possibilities.

This choice includes, in accordance with these two parameters, the maximum capacity required by the buyer and the level of the buyer's predisposition as to the price to be paid in order to best obtain this maximum capacity.

It is also possible to provide for a choice of several predisposition parameters to be proposed.

It is possible, for example, to program the definition of several classes of service: "gold" for a predetermined value of $\alpha$, "silver" for another value, or "bronze" for yet another value.

The "gold" class corresponds to a stronger predisposition to pay than the "silver" class, which corresponds to a stronger predisposition to pay than the "bronze" class.

We will now describe these mechanisms in detail, in order to provide a better understanding by means of a simple example in which there are only two buyers.

In the example that is given, the buyer 1 has a maximum quantity $q_{max}$ higher than that of the buyer 2, but his predisposition to pay is lower (these are values that the buyer sets for himself at the time of the auction). From this collected information, the auctioneer 200 calculates (for each price value p) the sum S of these two demand functions.

The auctioneer 200 can then determine an equilibrium price, based on the Walrasian equilibrium market price theory (this is well known and, therefore, details thereof are not deemed necessary) that equalizes the supply and the demand. This price corresponds to the value of p* such that S(p*)=Q. In fact, S(p*) actually corresponds to the total demand for the price p* and Q is by definition the quantity of the resource offered. Knowing p*, it is possible to determine the allocations $a_1$ and $a_2$ for each of the buyers. Each buyer obtains the quantity corresponding to its demand function for the price p*, i.e.: $a_1(s) = s_1(p^*)$ and $a_2(s) = s_2(p^*)$.

Figure 3:
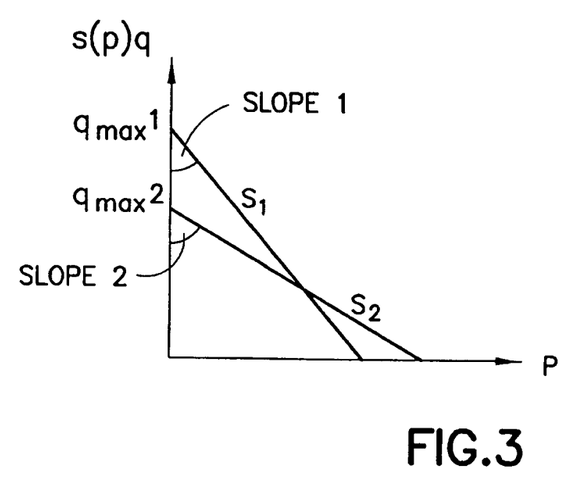
FIG. 3 represents an example of the demand functions $s_1$, $s_2$ of two buyers.

FIG. 3 illustrates the allocation step just described in the case of two buyers whose demand functions are affine (polynomial utility function of order 2).

The second step of the method consists of calculating the charge to be paid for each of the buyers. This step employs the exclusion-compensation principle. According to this principle, the buyer 1 must pay the price that the buyer 2 has declared himself prepared to pay in order to obtain the quantity that he would have had without the presence of the buyer 1.

In this simple example, the buyer 1 declares himself prepared to pay the inverse of $s_1$.

In essence, $s_1(p)$ represents the quantity demanded by the buyer 1 if the selling price is p. If the buyer 2 were absent from the sale, the buyer 1 would have received his maximum quantity demanded, which will be designated $q_1$. In order to go from his allocation $a_1$ to his maximum quantity $q_1$, the buyer 1 declares himself prepared to pay the integral of the inverse of $s_1$. The calculation of an integral is performed when going from a marginal price to a total price.

Figure 4:
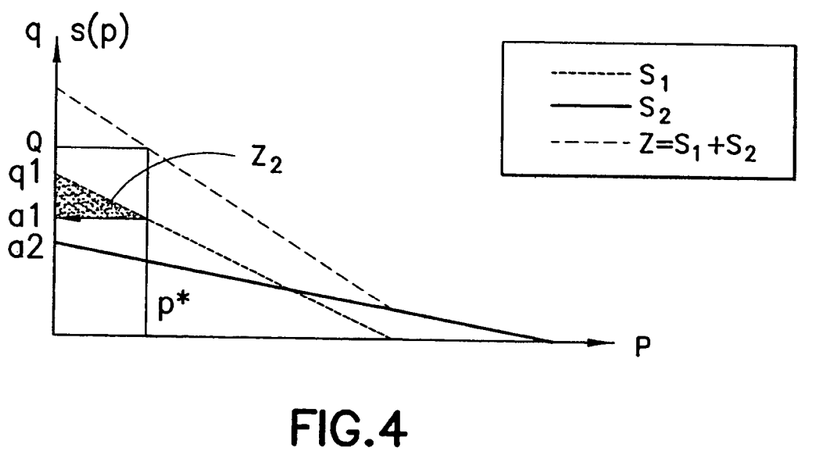
FIG. 4 schematically illustrates the method for calculating the pricing for this simple example with two buyers.

FIG. 4 illustrates these operations; the surface area of the hatched area referenced $Z_2$ corresponds to the result.

Because of the application of the exclusion-compensation principle in order to calculate this billing, the buyers have an incentive to bid their true demand function because this maximizes their gain function g as defined above (i.e., the utility, for a reduced quantity of a resource, of the charge to be paid in order to obtain this quantity).

This mechanism will hereinafter be called WSP (Walrasian Second Price) because it is based on the Walrasian equilibrium and on the principle of second price auctions.

The advantage of this WSP mechanism is that it has the "right" particular properties required of any auction mechanism without having the aforementioned disadvantages:

It is workable in the sense that a buyer is never billed more than he has declared himself prepared to pay.

There is a "discount" effect: the larger the quantity a buyer obtains, the lower the unit price he actually pays.

Each player is induced to bid his true demand function.

Figure 5:
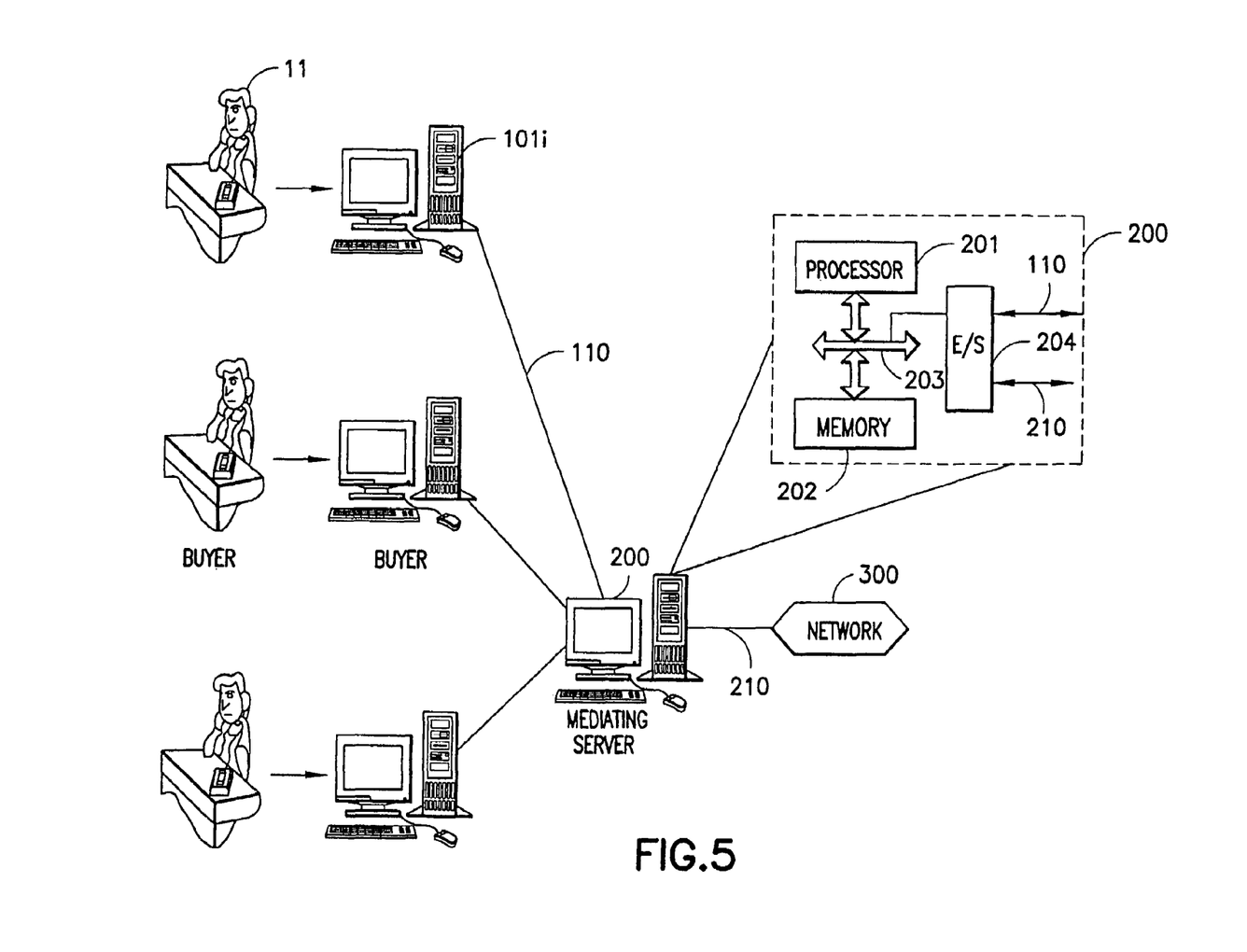
FIG. 5 illustrates the general diagram of a system for implementing the method.

FIG. 5 schematically illustrates the system for implementing the method. It can be, for example, a telecommunications resource management system.

A practical embodiment of the operational implementation of the auction mechanism just described is achieved through a set of automata or software buying agents $100i$. Each buyer i (but also the seller) programs his utility function and consequently his demand function (defined by only two parameters in the examples indicated) into his automaton or software agent $100i$.

In fact, these functions can be predefined and in that case the buying agent has only to choose one of them. These buying agents dialog with the server 200 to negotiate their resource allocation and the charge to be paid for this resource by setting the bid in each auction.

The server 200 or resource management system is linked to a telecommunication network 300 and to the buying agents $100i$ by linking means 210 and 110. This server 200 includes an automaton programmed to perform the aforementioned calculations implementing the mechanism described. This automaton includes a processing unit of the processor type 201, storage means 202, and an input-output interface 204. The automaton includes links with the outside 210 to the network 300 and 110 to the buying agents $100i$.

Figure 6:
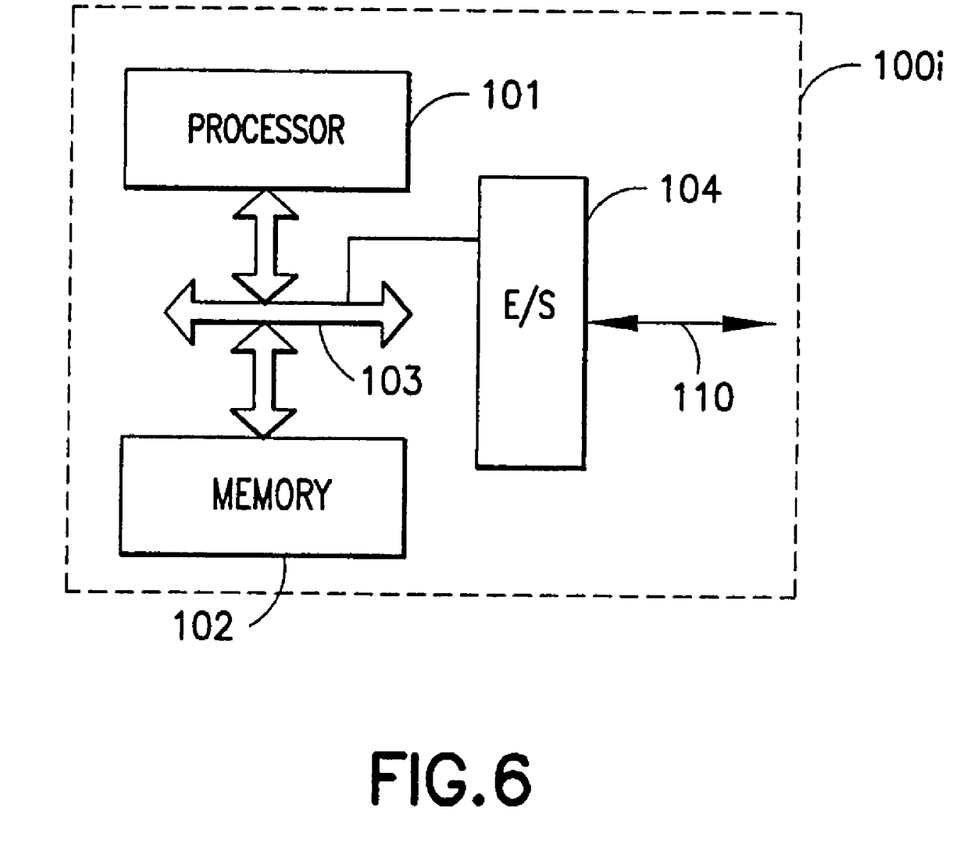
FIG. 6 illustrates a diagram of an embodiment of a buying agent.

FIG. 6 illustrates an exemplary embodiment of an automaton installed in the buying agent $100i$. This automaton includes a processor 101 linked to storage means symbolized by the block 102. These storage means comprise at least one random access working memory, a program memory of the ROM or EEPROM type containing the program for providing the buyer's utility and demand functions and for dialoguing with the server. The processor 101 and the memories 102 are linked by a bus 103, itself linked to an input-output port to a communication link 110 with the server 200.

These software agents $100i$ can be located near the buyer i, i.e., in the buyer's control terminal, when the latter wishes to have continuous interaction with its demand function.

In the case where a buyer's demand function remains stable, the buyer's software negotiating agent can be located in the server 200.

In the diagram of FIG. 5, the shared resource Q corresponds to the bandwidth of the link shown between the server and the "network."

The advantage of locating the buyer's software negotiating agent in the server lies in reducing the flow of control information flowing back and forth between the server and the buying agents and in accelerating the dialog between the negotiating automaton of the buying buyer and the server. When a buying agent is located near the server, it does not generate any control messages in the network.

The server handles all of the bids from the buyers and calculates the result of the auction using the mechanism described.

In the case of the sharing of the bandwidth of a link, the auctioneer can be a software server located in the concentration router or any other concentration equipment.

After making its decision, the auctioneer then actuates the equipment (in the above-mentioned example, the concentration router) so that it allocates the quantity decided upon to each of the buyers. The charges to be paid are also stored in order to be furnished to the server responsible for the billing. This translates into an incrementation of the buyer's account by the sum to be paid or a decrementation of the number of "tokens" credited to the buyer's account. For this purpose, the mediating server (auctioneer) communicates the necessary information to the server responsible for the billing.

For other resources, this could be a dedicated server. It should be noted that the server and the automata are connected by links of the network and therefore use the network resource (bandwidth).

Because the method of the invention determines an equilibrium of the allocations and the prices in a single operation, it limits the utilization of the resource, unlike PSP auctions, which are iterative.

The method of the invention is fully adapted to dynamic operation. Buyers can connect in order to participate in the auction at any time. The mechanism then makes it possible to recalculate the allocation and the charge to be paid by each.

Unlike in PSP auctions, equilibrium is reached automatically because the buying automata do not bid the demand functions that correspond to their evaluation of the resource bit by bit, but directly. A buyer who holds the resource can nevertheless be ousted by the arrival of a new competing buyer.

Since the buyers can "enter" and "exit" at any time, the invention provides for transactions to be performed in money-time units. The auction prices and charges to be paid are calculated in time units. For example, the buyers pay x Euros per megabits per second obtained. If this were not the case, a buyer who held a quantity of a resource for only a few seconds (i.e., when other buyers have arrived and have "confiscated" part or all of his resource through a higher bid), would pay the same price as though he had held this same quantity for several days.

The minimum time pricing unit can be the time increment between two renegotiations of the bid: the minimum holding time of the resource.

The mechanism can be designed so that it is not necessary to require the "satisfied" buyers to rebid at each renegotiation. The auctioneer can essentially assume their demand function to be constant by default.

In order to detect a buyer's departure, it is possible to provide for the resending of all the demand functions by the buyer's negotiating automata at each stage. This simple means makes it possible to detect a departure.

As we have seen, by bidding only once during a negotiation, an equilibrium is reached in which the buyers bid their true demand function and hence their true evaluation function. The fact that the equilibrium sought by any auction mechanism is reached in a single iteration constitutes a considerable advantage relative to the existing mechanisms.

Added to this advantage is the advantage over the other mechanisms proposed, that the mechanism requires fewer technical hypotheses on the characteristics of the buyers. The only hypothesis made is that the demand functions must be decreasing, which is completely natural. It is unimaginable that a buyer would be prepared to pay more for the resource (in the sense of the unit price) when the quantity he is demanding increases. This would run counter to the "discount" effects that are normally encountered. Finally, unlike in the iterative method of PSP auctions, the buyers are not informed at each iteration of the bids made by their competitors. In fact, it has been demonstrated that this information would permit collusion among buyers in order to pay less, and other drawbacks such as the possibility for the seller to maximize his income based on bids declared by all of the buyers. These phenomena can, in the end, induce buyers to "lie" in order to gain the advantage (by not declaring their true evaluation function, or even cheating), which completely calls into question the interest and the relevance of the auction system (loss of confidence on the part of the buyers).

It is quite the opposite with the method just described, since the mechanism does not in any way reveal what has been bid by a buyer and his competitors. Only the auctioneer knows the demand functions of the various buyers, and it is of course possible to secure the negotiation process in order to guarantee this confidentiality. Nevertheless, the auction mechanism remains transparent. By returning to each buyer the value of the "fictitious" equilibrium price p* it has calculated, the auctioneer can "explain" the allocation and the calculation of the charge it has performed. The unit charge to be paid (i.e., $C_i(s)/a_i$) for a buyer is actually lower by design than this fictitious marginal price p*.

I claim:

1. A system for allocating resources, comprising:
a network server communicatively coupled to a network; and
a buying agent communicatively coupled to the network, wherein the buying agent comprises:
a processor; and
data storage comprising data and programming instructions for:
transmitting one bid to the network server in the form of a resource demand function, wherein the resource demand function is a positive, decreasing function that expresses the buying agent's demand for an allocable resource at a variable price; and
receiving from the network server an allocated quantity of the allocable resource as calculated by the server and a charged price for the buying agent as calculated by the server, wherein the allocated quantity is the resource demand function of an equilibrium price, wherein the charged price is less than or equal to the equilibrium price, and wherein the server calculates the charged price, $C_i$, for a buying agent i according to the equation:

$$C_i = \sum_{j \neq i} \int_{a_j^s}^{a_j^0} s_j^{-1}(p) \, dp$$

wherein $a_j^s$ expresses the quantity allocated to buying agent j in the presence of buying agent i and $a_j^0$ expresses the quantity that would have been allocated to buying agent j had buying agent i been absent and $s_j^{-1}$ represents the inverse of the resource demand function of buying agent j.

2. The system of claim 1, wherein the resource demand function is characterized by two selectable parameters, a maximum quantity desired by the buying agent and a coefficient indicating the buying agent's predisposition to pay.

3. The system of claim 1, further comprising a link communicatively coupled to the network and having divisible bandwidth, wherein the allocable resource comprises the bandwidth of the link.

4. The system of claim 3, wherein receiving from the network server an allocated quantity of the allocable resource comprises consuming no more than the allocated quantity of bandwidth.

5. The system of claim 1, wherein the data storage further comprises data and programming instructions for receiving a bill for the charged price.

6. The system of claim 1 wherein the data storage further comprises data and programming instructions for receiving an updated allocated quantity of the allocable resource and an updated charged price without the transmission of an updated bid.

* * * * *